United States Patent
Chiba (10) Patent No.: US 7,626,726 B2
(45) Date of Patent: Dec. 1, 2009

(54) APPARATUS AND SYSTEM FOR IMAGE PROCESSING BASED ON EXTRACTED IMAGE PORTION

(75) Inventor: Kunihisa Chiba, Izumi (JP)

(73) Assignee: Sharp Kabushiki Kaisha, Osaka (JP)

( * ) Notice: Subject to any disclaimer, the term of this patent is extended or adjusted under 35 U.S.C. 154(b) by 670 days.

(21) Appl. No.: 11/399,424

(22) Filed: Apr. 7, 2006

(65) Prior Publication Data

US 2006/0232831 A1    Oct. 19, 2006

(30) Foreign Application Priority Data

Apr. 15, 2005   (JP)   ............... 2005-119062

(51) Int. Cl.
  G06K 15/02  (2006.01)
  H04N 1/38   (2006.01)
  H04N 1/387  (2006.01)
  B41M 3/10   (2006.01)
  B41M 3/14   (2006.01)

(52) U.S. Cl. .................. 358/1.9; 358/3.28; 358/1.14

(58) Field of Classification Search ........ 358/1.9, 358/2.1, 3.28, 1.14, 1.15, 1.18, 526, 530, 358/540, 443, 448, 464; 382/100, 135, 137; 283/72, 113, 114, 902
See application file for complete search history.

(56) References Cited

U.S. PATENT DOCUMENTS

| | | | | |
|---|---|---|---|---|
| 5,321,470 A | * | 6/1994 | Hasuo et al. | ............... 399/366 |
| 5,434,649 A | * | 7/1995 | Hasuo et al. | ............... 399/366 |
| 5,583,614 A | * | 12/1996 | Hasuo et al. | ............... 399/4 |
| 5,652,803 A | * | 7/1997 | Tachikawa et al. | ........... 382/135 |
| 5,659,628 A | * | 8/1997 | Tachikawa et al. | ........... 382/135 |
| 5,765,089 A | * | 6/1998 | Hasuo et al. | ............... 399/366 |
| 6,175,714 B1 | | 1/2001 | Crean | |
| 6,185,404 B1 | * | 2/2001 | Hasuo et al. | ............... 399/366 |
| 6,876,460 B2 | * | 4/2005 | Torigoe | .................... 358/1.14 |
| 7,190,475 B2 | * | 3/2007 | Nomoto | .................... 358/1.15 |
| 7,339,689 B2 | * | 3/2008 | Hiraoka | .................... 358/1.15 |
| 2005/0129270 A1 | * | 6/2005 | Prakash | .................... 382/100 |

FOREIGN PATENT DOCUMENTS

| | | |
|---|---|---|
| EP | 0 651 554 A1 | 5/1995 |
| JP | 4-14182 A | 1/1992 |
| JP | 7-212712 A | 8/1995 |
| JP | 2001-103305 A | 4/2001 |
| JP | 2001-250057 A | 9/2001 |
| JP | 2005-12623 A | 1/2005 |

* cited by examiner

*Primary Examiner*—Scott A Rogers
(74) *Attorney, Agent, or Firm*—Birch, Stewart, Kolasch & Birch, LLP (57) ABSTRACT

In a multifunction apparatus (image processing apparatus) 1 having an image reader 2 that reads an image of a document and an image processor 13 that performs a processing on the original image read by the image reader 2, an additional image related to a processing condition of the original image being added to the original image read by the image reader 2, the image processor 13 extracts the additional image from an image read by the image reader 2 and performs the processing in accordance with the processing condition based on the extracted image. An image processing system has the image processing apparatus and an image recording apparatus that records an image onto a sheet adds, to the image recorded onto sheet, the additional image related to the processing condition of the image.

17 Claims, 9 Drawing Sheets

APPARATUS AND SYSTEM FOR IMAGE PROCESSING BASED ON EXTRACTED IMAGE PORTION

CROSS-REFERENCE TO RELATED APPLICATION

This Nonprovisional application claims priority under 35 U.S.C. §119(a) on Patent Application No. 2005-119062 in Japan on Apr. 15, 2005, the entire contents of which are hereby incorporated by reference.

BACKGROUND OF THE INVENTION

1. Field of the Invention

The present invention relates to an image processing apparatus having image reading means for reading an image of an original (a document) and image processing means for performing a processing on the image read by the image reading means, an image recording apparatus that records an image onto a sheet, and an image processing system having the image processing apparatus and the image recording apparatus.

2. Description of the Related Art

Copiers and multifunction apparatuses that copy originals to sheets have been conventionally widely used, and in recent years, copiers and multifunction apparatuses capable of color copying have been increasing. Further, the copying performance has improved, and high-precision copying can be performed. However, as the copying performance improves, a problem arises that a copy having substantially the same quality as the original is possible. For this reason, an apparatus has been proposed that limits the output of a specific area of an image by a password (see, for example, Japanese Patent Application Laid-Open No. H04-14182). With the use of this apparatus, when the password does not coincide, the specific area is deleted, and only the part other than the specific area is printed. It is also performed to add digital watermarking to the image (see, for example, Japanese Patent Application Laid-Open No. H07-212712).

SUMMARY OF THE INVENTION

However, when the output of a specific area is limited by a password, it is necessary to take the trouble to input the password. When a specific area is not outputted, although the effect of preventing copying is obtained because the printed image is a meaningless image, usability is poor. On the other hand, when digital watermarking is added to the image, although the image can be authenticated based on the presence or absence of the watermarking, copying cannot be limited.

The present invention is made in view of such circumstances, and an object thereof is to provide an image processing apparatus and an image processing system in which since extracting means for extracting an additional image related to the processing condition from the read original image is provided and the processing is performed in accordance with the processing condition based on the extracted additional image, a required processing can be automatically performed for each original image to which the additional image is added.

Another object of the present invention is to provide an image processing apparatus in which since the image processing means performs a processing to change the size of the image and/or a processing to change the number of colors of the image and the processing condition includes the processing condition related to the processing to change the size of the image and/or the processing to change the number of colors of the image, a change in the size and/or a change in the number of colors can be specified for each original image to which the additional image is added.

Another object of the present invention is to provide an image processing apparatus in which since image recording means for recording an image onto a sheet is provided and the processing condition includes the processing condition related to the processing to record the image onto the sheet, the processing condition of the image recording processing can be specified for each original image to which the additional image is added.

Another object of the present invention is to provide an image processing apparatus in which since charging means for performing a processing to charge for a processing is provided and the processing condition includes the condition related to the charging processing, the processing condition of the charging processing can be specified for each original image to which the additional image is added.

Another object of the present invention is to provide an image processing apparatus in which since inhibiting means is provided for inhibiting the image processing means from performing the processing when the image processing means is not ready for the processing condition based on the image extracted by the extracting means, printing or the like can be prevented from being performed without the processing condition satisfied.

Another object of the present invention is to provide an image processing apparatus in which since transmitting means for transmitting information related to the processing performed by the image processing means is provided, the performance of the reading of the original image to which the additional image is added and the contents of the processing performed on the original image can be checked.

Another object of the present invention is to provide an image processing system in which since the image related to the processing condition is an image difficult to visually recognize, the adverse effect of the addition of the additional image can be minimized and the difference between before and after the additional image is added can be minimized.

Another object of the present invention is to provide an image processing system and an image recording apparatus in which since adding means is provided for adding the image related to the processing condition of the image recorded onto the sheet to the image recorded onto the sheet, the original image to which the additional image related to the processing condition is added can be recorded onto a sheet.

In an image processing apparatus according to the present invention having: image reading means for reading an image of an original; and image processing means for performing a processing on the image read by the image reading means, and in which an image related to the processing condition of the image read by the image reading means is added to the image read by the image reading means, extracting means is provided for extracting the image related to the processing condition, from the image read by the image reading means, and the image processing means performs the processing in accordance with the processing condition based on the image extracted by the extracting means.

In the image processing apparatus according to the present invention, the image processing means performs a processing to change the size of the image and/or a processing to change the number of colors of the image, and the processing condition includes the processing condition related to the processing to change the size of the image and/or the processing to change the number of colors of the image.

In the image processing apparatus according to the present invention, image recording means for recording an image onto a sheet is provided, and the processing condition includes the processing condition related to a processing to record the image onto the sheet.

In the image processing apparatus according to the present invention, charging means for performing a processing to charge for an image processing is provided, and the processing condition includes the processing condition related to the charging processing.

In the image processing apparatus according to the present invention, inhibiting means is provided for inhibiting the image processing means from performing the processing when the image processing means is not ready for the processing condition based on the image extracted by the extracting means.

In the image processing apparatus according to the present invention, transmitting means is provided for transmitting information related to the processing performed by the image processing means.

In an image processing system according to the present invention including: an image processing apparatus having image reading means for reading an image of an original and image processing means for performing a processing on the image read by the image reading means; and an image recording apparatus that records an image onto a sheet, and in which an image related to the processing condition of the image read by the image reading means is added to the image read by the image reading means, the image processing apparatus has extracting means for extracting the image related to the processing condition, from the image read by the image reading means, the image processing means performs the processing in accordance with the processing condition based on the image extracted by the extracting means, and the image recording apparatus has adding means for adding an image related to the processing condition of the image recorded onto the sheet to the image recorded onto the sheet.

In the image processing system according to the present invention, the image related to the processing condition is an image difficult to visually recognize.

In an image recording apparatus according to the present invention that records an image onto a sheet, adding means is provided for adding an image related to the processing condition of the image recorded onto the sheet to the image recorded onto the sheet.

According to the present invention, to the image read by the image reading means (hereinafter, referred to as original image), an image related to the processing condition of the original image (hereinafter, referred to as additional image) is added, the extracting means extracts the additional image from the original image, and the image processing means performs the processing on the original image in accordance with the processing condition based on the extracted additional image, so that a required processing can be automatically performed for each original image. The additional image is a pattern-recognizable image such as a two-dimensional code, and the association between the pattern such as a two-dimensional code and the processing condition is pre-stored in a storage unit incorporated in the apparatus. Alternatively, the additional image is an image character-recognizable by, for example, an OCR (optical character reader), and the processing condition such as the processing code can be character-recognized.

According to the present invention, the processing condition includes the processing condition related to the processing to change the size of the image and/or the processing to change the number of colors of the image and the image processing means performs the processing to change the size of the original image and/or the processing to change the number of colors of the original image in accordance with the processing condition, so that, for example, by the processing condition being a reduction in the size and/or a reduction in the number of colors, the copying of the original image can be restricted. Consequently, for example, high-quality copying of the original image can be prevented.

According to the present invention, the processing condition includes the processing condition related to the processing to record an image onto a sheet and the image recording means records the image onto the sheet in accordance with the processing condition, so that, for example, by the processing condition being a selection of the paper tray, the sheet on which the original image is recorded can be restricted.

According to the present invention, the processing condition includes the processing condition related to the charging processing and the charging means performs the charging processing in accordance with the processing condition, so that, for example, by the processing condition being the presence or absence of charging, charging can be performed for a specific original image. Moreover, for example, by the processing condition being the amount of money charged for each processing, the amount of money charged can be changed according to the processing.

According to the present invention, when the image processing means is not ready for the processing condition based on the image extracted by the extracting means, the inhibiting means inhibits the image processing means from performing the processing, so that printing or the like can be prevented from being performed without the processing condition satisfied. For example, when the processing condition is a reduction of the original, the inhibiting means inhibits the processing in the case of an image processing apparatus having no reduction function, so that printing or the like can be prevented from being performed without the image reduction performed.

According to the present invention, information related to the processing performed by the image processing means is transmitted from the transmitting means, so that the information related to the processing performed on the original image is transmitted to a predetermined destination of transmission every time an original image to which the additional image is added is read. For example, the processing code of copying or FAX is transmitted. The apparatus at the destination can check the performance of the reading of the original image to which the additional image is added and the contents of the processing performed on the original image, and can manage, for example, the number of times of execution of each kind of processing.

According to the present invention, the image related to the processing condition is an image difficult to visually recognize, so that the adverse effect of the addition can be minimized and the difference between before and after the addition can be minimized. The image difficult to visually recognize includes an image of a color difficult for the human eye to recognize such as yellow and/or an image of fine lines difficult for the human eye to recognize.

According to the present invention, to the image recorded onto a sheet, the additional image related to the processing condition of the image is added by the adding means, so that it can be performed to record onto a sheet an image to which the additional image is added, read the image recorded on the sheet by the above-described image processing apparatus or the like and extract the additional image from the read image.

The addition of the additional image can be performed, for example, when an addition instruction is accepted from an operation unit.

According to the present invention, a required processing can be automatically performed for each original image to which the additional image is added.

According to the present invention, a change in the size and/or a change in the number of colors can be specified for each original image to which the additional image is added. For example, by the processing condition being a reduction in the size and/or a reduction in the number of colors, the copying of the original image can be restricted.

According to the present invention, the processing condition of the image recording processing can be specified for each original image to which the additional image is added. For example, by the processing condition being the specification of the paper tray, the sheet on which the original image is recorded can be restricted.

According to the present invention, the processing condition of the charging processing can be specified for each original image to which the additional image is added. For example, by the processing condition being the presence or absence of charging, charging can be performed for a specific original image, and by the processing condition being the amount of money charged for each processing, the amount of money charged can be changed according to the processing.

According to the present invention, printing or the like can be prevented from being performed without the processing condition based on the additional image being satisfied.

According to the present invention, the performance of the reading of the original image to which the additional image is added and the contents of the processing performed on the original image can be checked, and the number of times of execution of each kind of processing can be managed.

According to the present invention, the adverse effect of the addition of the additional image can be minimized and the difference between before and after the addition can be minimized.

According to the present invention, the original image to which the additional image related to the processing condition is added can be recorded onto a sheet.

The above and further objects and features of the invention will more fully be apparent from the following detailed description with accompanying drawings.

DETAILED DESCRIPTION OF THE INVENTION

First Embodiment

Figure 1:
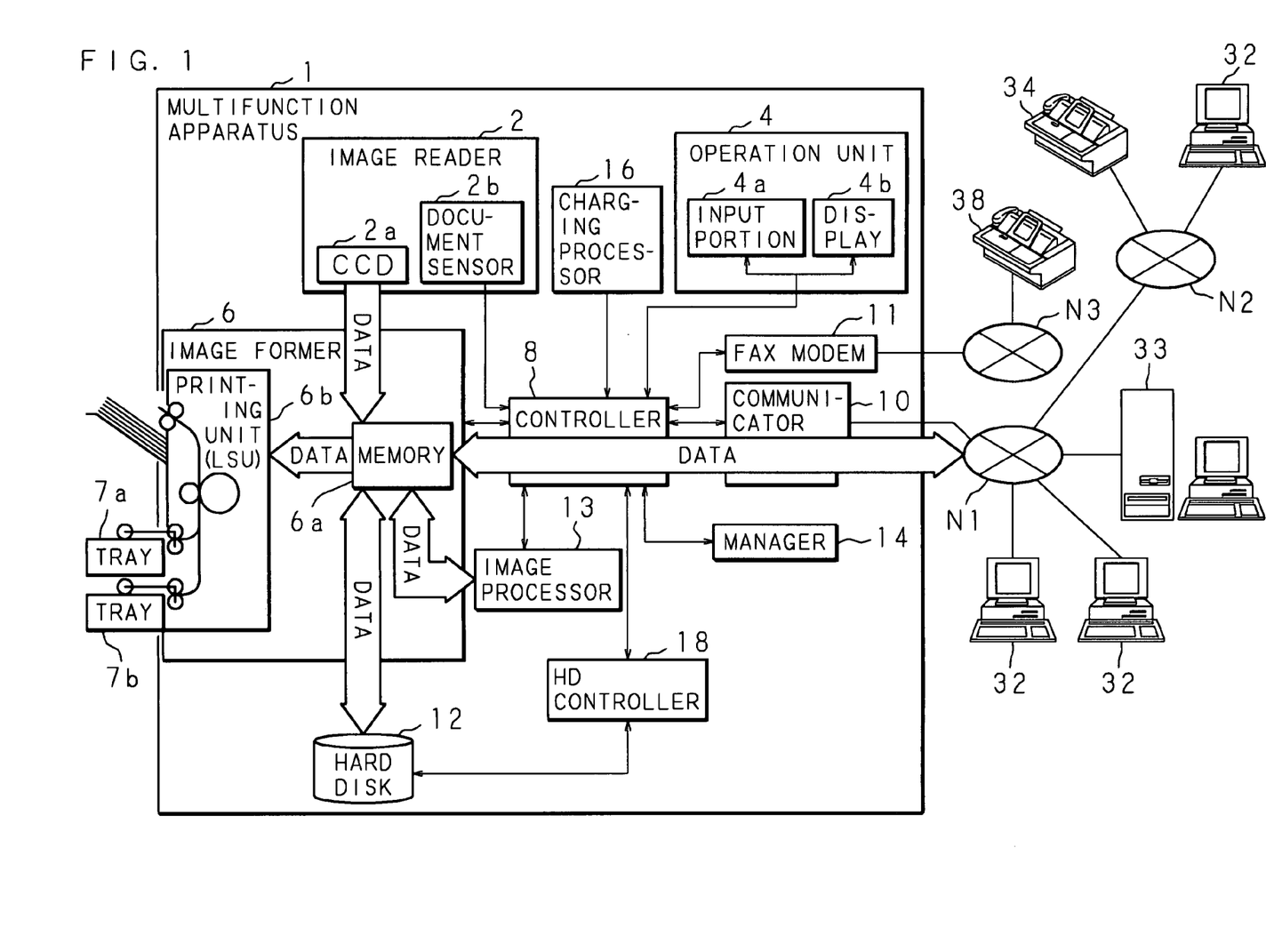
FIG. 1 is a block diagram showing an example of an image processing system including an image processing apparatus (multifunction apparatus) according to the present invention.

Hereinafter, the present invention will be concretely described with reference to the drawings showing embodiments thereof. FIG. 1 is a block diagram showing an example of an image processing system including an image processing apparatus (multifunction apparatus) according to the present invention. A multifunction apparatus (image processing apparatus) 1 is connected to an internal network N1 such as a LAN (local area network) constructed in a company. A plurality of personal computers (hereinafter, referred to as PCs) 32 and 33 are connected to the internal network 1. The internal network N1 is connected to an external network N2 such as the Internet constructed outside a company. An Internet fax (hereinafter, referred to as iFAX) 34 and the PC 32 are connected to the external network N2.

The multifunction apparatus 1 includes the following: an image reader (image reading means) 2, such as an image scanner, having a CCD (charge coupled device) 2a and an document sensor 2b; an operation unit 4 having an input portion 4a such as an input key and a display 4b such as a liquid crystal display panel; an image former (image recording means (image processing means)) 6 having a memory 6a, such as a DRAM (dynamic random access memory), that stores image data, trays 7a and 7b holding recording paper (sheets), and a printing unit (LSU: laser scanning unit) 6b forming images on sheets; a communicator 10, such as a LAN interface, that performs communication with the internal network N1; a FAX modem 11 connected to a telephone network N3; a hard disk drive (hereinafter, referred to as hard disk) 12 that stores the image data accepted from the image reader 2 or the communicator 10; a hard disk controller (hereinafter, referred to as HD controller) 18 that controls the reading and writing of data from and onto the hard disk 12; an image processor (image processing means) 13 that performs image processing on the image data read by the memory 6a; a charging processor (charging means) 16 that performs the processing of charging for image recording onto sheets; a manager 14, such as a flash memory, that stores a control program and various settings; and a controller 8, such as a CPU (control processing unit), that controls the above-mentioned components in the apparatus according to the control program.

The components of the multifunction apparatus 1 are controlled by the controller 8, and for example, the following can be performed: an operation instruction is accepted from the input portion 4a such as a touch panel or an input key or a coin insertion information is accepted from the charging processor 16, and a processing corresponding to the accepted operation instruction or insertion information is performed; and information on the operation status of the multifunction apparatus 1 is displayed on the display 4b to thereby notify the user of necessary information. Moreover, the manager 14 stores information on the operation settings of the components, and the controller 8 controls the overall operation of the multifunction apparatus 1 based on the information. According to the present embodiment, the multifunction apparatus 1 is capable of operating as a copier, a printer, a network scanner, and a facsimile.

When the multifunction apparatus 1 is used as a copier, for example, by accepting a selection of the copy function by the operation unit 4, by the control by the controller 8, the original set on the image reader 2 is electrically read, the read image data is stored into the hard disk 12 through the memory 6*a*, and the image data is transmitted from the hard disk 12 to the printing unit 6*b* through the memory 6*a* in accordance with the printing timing of the printing unit 6*b*.

When the multifunction apparatus 1 is used as a printer, for example, by receiving by the communicator 10 the image data transmitted from the PC 32 connected to the internal network N1, by the control by the controller 8, the received image data is transmitted to the hard disk 12 through the memory 6*a*, and transmitted to the printing unit 6*b* similarly to the above-described case where the multifunction apparatus 1 is used as a copier.

When the multifunction apparatus 1 is used as a network scanner, for example, by accepting a selection of data transmission by the operation unit 4, by the control by the controller 8, the original (the document) set on the image reader 2 is electrically read, the read image data of the original is stored into the hard disk 12 through the memory 6*a* and then, transmitted from the communicator 10 to the destination accepted by the operation unit 4. As the designation of transmission of the image data, the PC 32 on the internal network N1, the PC 32 on the external network N2, or the iFAX 34 can be specified. Moreover, it can be performed to specify a facsimile number as the destination and transmits the image data from the FAX modem 11 to an external facsimile 38 through the telephone network N3.

To the original image read by the image reader 2, an additional image related to the processing condition of the original image is added. The additional image is a pattern-recognizable image such as a two-dimensional code, and for the additional image, yellow, fine lines or the like is used so that the image is difficult to visually recognize. The image processor 13 operates as extracting means for extracting the additional image from the original image read by the image reader 2, and transmits the extracted additional image to the controller 8. The controller 8 controls the image processor 13, the image former 6 or the like so as to perform a processing on the original image in accordance with the processing condition based on the additional image. The association between the additional image (pattern such as a two-dimensional code) and the processing condition (the processing code or the processing setting) is prestored in the manager 14.

The processing condition includes the processing condition related to the processing to change the size of the image and/or the processing to change the number of colors of the image, and by the control by the controller 8 based on the processing condition corresponding to the additional image, the processing to change the size of the original image and/or the processing to change the number of colors of the image is performed by the image processor 13. Moreover, the processing condition includes the processing condition related to the processing to record images onto sheets, and by the control by the controller 8 based on the processing condition, the recording of the original image onto a sheet is performed by the image former 6. Moreover, the processing condition includes the processing condition related to the charging processing, and by the control by the controller 8 based on the processing condition, the charging for the image processing (for example, printing) of the original image is performed by the charging processor 16.

Figure 2A:
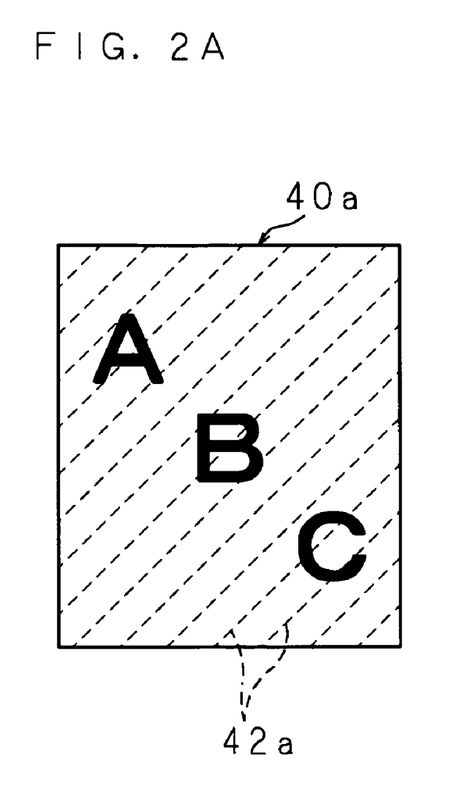
FIGS. 2A and 2B are views showing an example of an original image and a sheet where an image based on the original image is recorded.
Figure 2B:
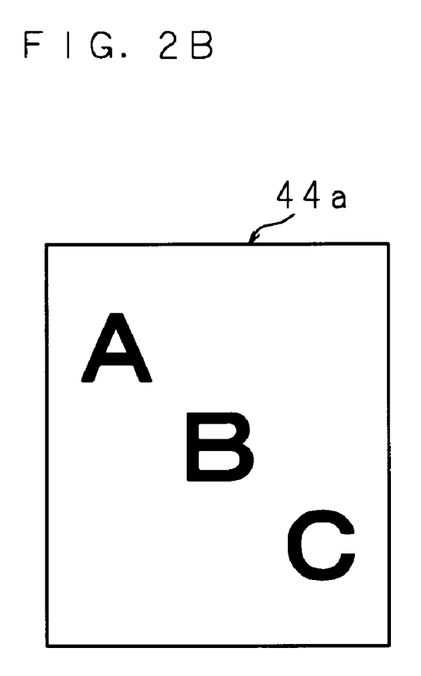

FIGS. 2A to 7B are views showing examples of original images and sheets where images based on the original images are recorded. In the example of FIGS. 2A and 2B, an additional image 42*a* to allow an original image 40*a* to be copied as it is (without any copy restriction) is added to the original image 40*a*, and by the control by the controller 8 based on the additional image 42*a*, the original image is recorded onto a sheet 44*a* as it is.

Figure 3A:
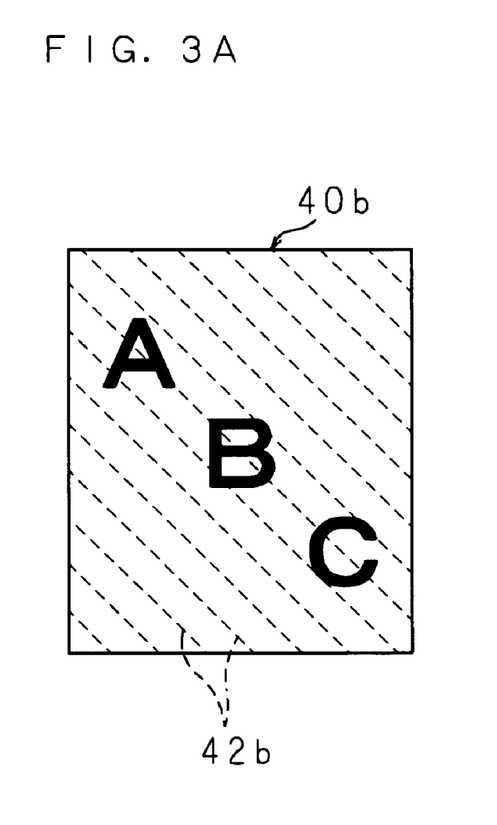
FIGS. 3A and 3B are views showing an example of an original image and a sheet where an image based on the original image is recorded.
Figure 3B:
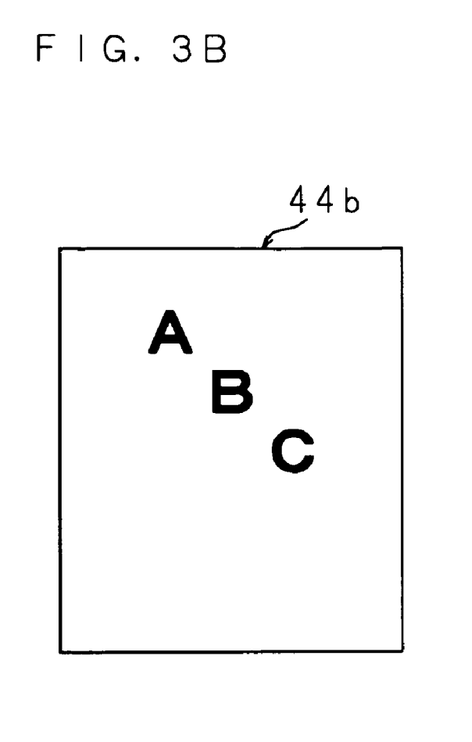

In the example of FIGS. 3A and 3B, an additional image 42*b* corresponding to an image reduction processing is added to an original image 40*b*, and by the control by the controller 8 based on the additional image 42*b*, the original image that is reduced by the image processor 13 is recorded onto a sheet 44*b*.

Figure 4A:
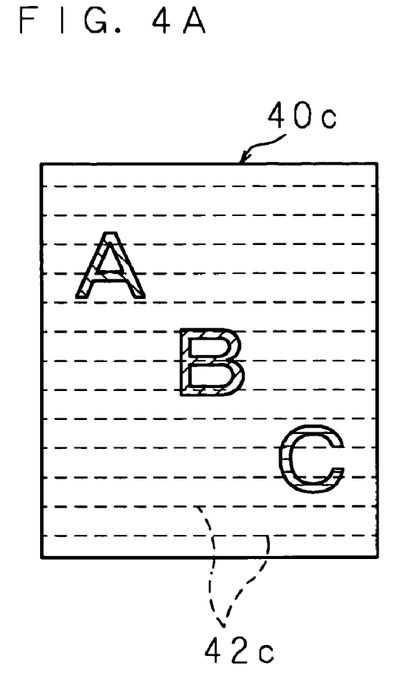
FIGS. 4A, 4B and 4C are views showing an example of an original image and a sheet where an image based on the original image is recorded.
Figure 4B:
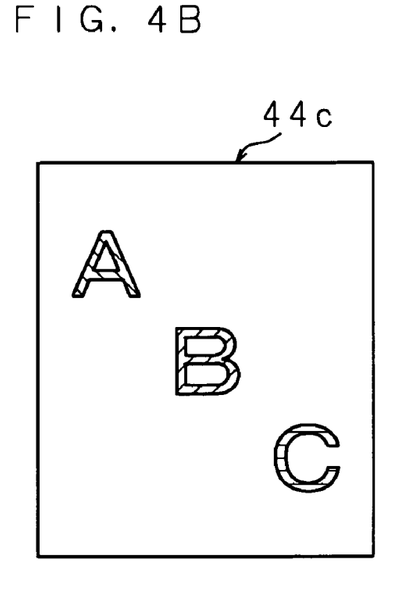
Figure 4C:
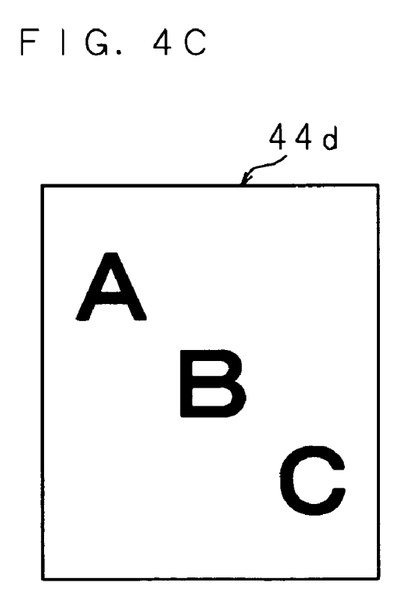

In the example of FIGS. 4A, 4B and 4C, an additional image 42*c* corresponding to the charging processing and the number of colors changing processing corresponding to the amount of money charged is added to a color original image 40*c*, and by the control by the controller 8 based on the additional image 42*c*, when the amount of money charged is, for example, 50 yen, the original image is recorded in color onto a sheet 44*c*, and when the amount of money charged is, for example, 10 yen, the original image is recorded in black and white onto a sheet 44*d*.

Figure 5A:
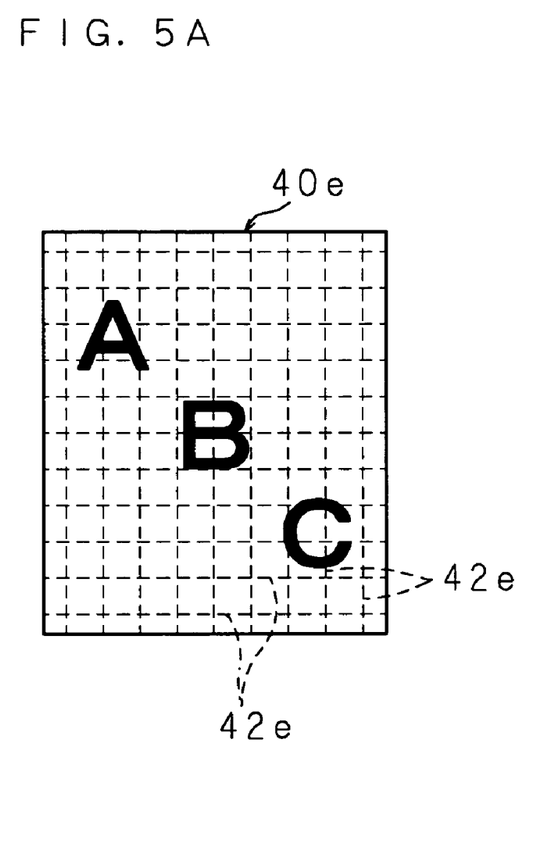
FIGS. 5A and 5B are views showing an example of an original image and a sheet where an image based on the original image is recorded.
Figure 5B:
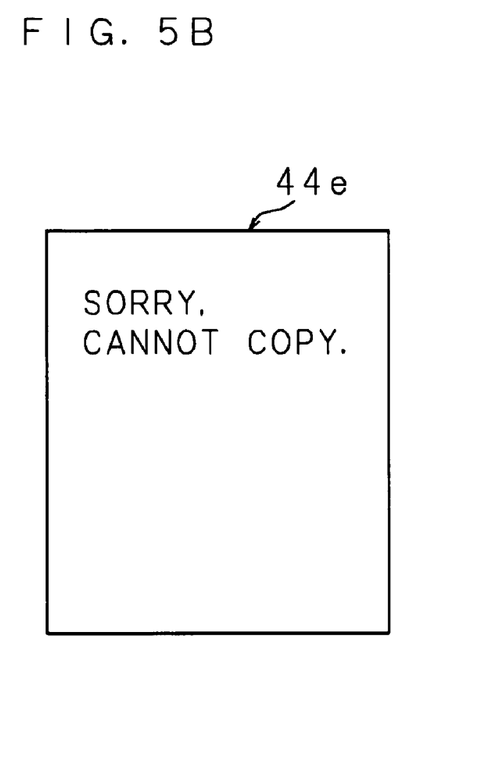

In the example of FIGS. 5A to 5B, an additional image 42*e* inhibiting copying is added to an original image 40*e*, and by the control by the controller 8 based on the additional image 42*e*, the image recording onto the sheet by the image former 6 is inhibited. Consequently, by the control by the controller 8, a message saying that copying is impossible is recorded onto a sheet 44*e*. The copying impossible message may be displayed on the display 4*b* by the control by the controller 8 instead of being recorded onto the sheet.

Figure 6A:
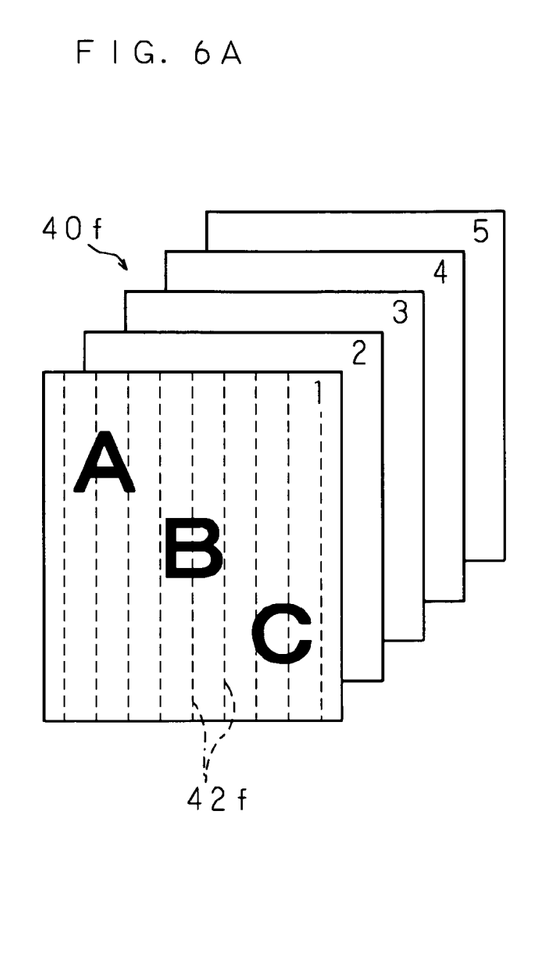
FIGS. 6A and 6B are views showing an example of an original image and a sheet where an image based on the original image is recorded.
Figure 6B:
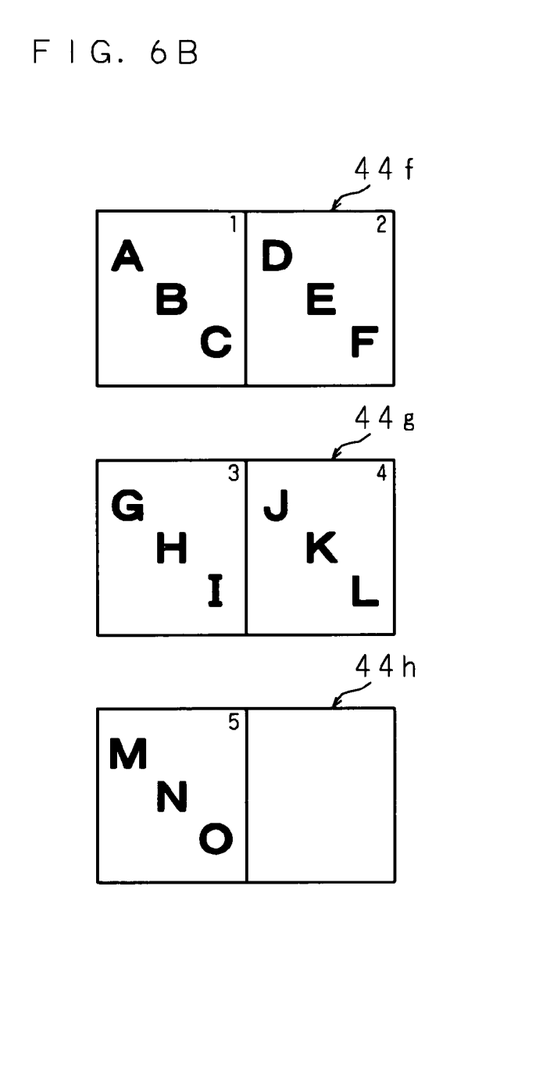

In the example of FIGS. 6A and 6B, an additional image 42*f* corresponding to an image combining processing (processing to reduce a plurality of originals and print them onto one sheet) is added to a plurality of (five in the example of the figures) original images 40*f*, and by the control by the controller 8 based on the additional image 42*f*, a first and a second original image, a third and a fourth original image, and a fifth original image reduced and combined by the image processor 13 are recorded onto sheets 44*f*, 44*g* and 44*h*, respectively.

Figure 7A:
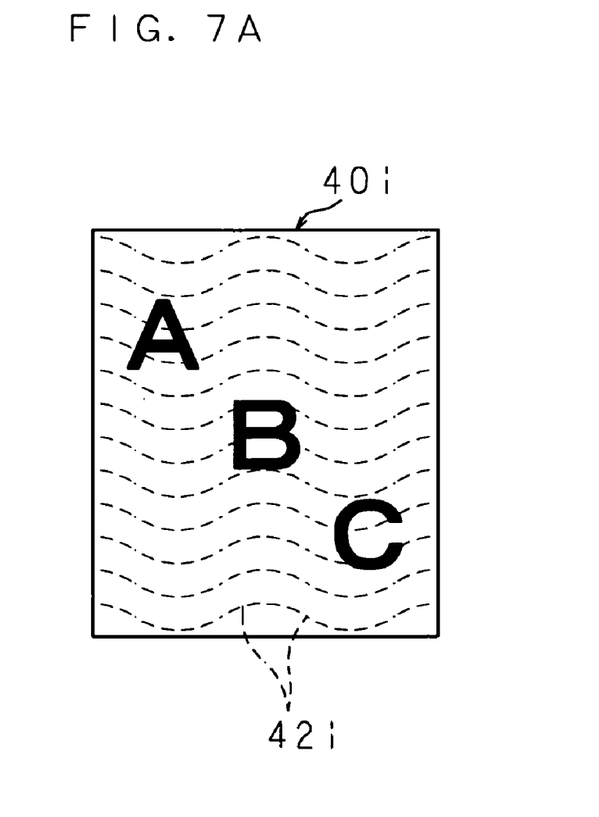
FIGS. 7A and 7B are views showing an example of an original image and a sheet where an image based on the original image is recorded.
Figure 7B:
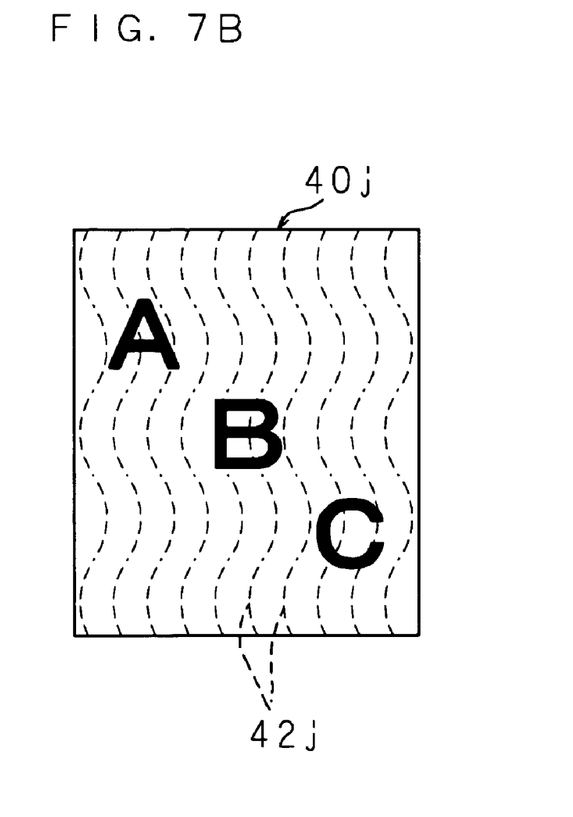

In the example of FIG. 7A, an additional image 42*i* corresponding to the image recording onto plain paper (tray 7*a*) is added to an original image 40*i*, and by the control by the controller 8 based on the additional image 42*i*, the original image is recorded onto the plain paper supplied from the tray 7*a*. In the example of FIG. 7B, an additional image 42*j* corresponding to the image recording onto special paper (tray 7*b*) such as thick paper or color paper is added to an original image 40*j*, and by the control by the controller 8 based on the additional image 42*j*, the original image is recorded onto the special paper such as thick paper or color paper supplied from the tray 7*b*.

The association between the additional image (pattern such as a two-dimensional code) and the processing condition (the processing code or the processing setting) is prestored in the manager 14. The controller 8 operates as inhibiting means for inhibiting the image processor 13 or the image former 6 from performing the processing when the image processor 13 or the image former 6 is not ready for the processing condition related to the additional image extracted from the original image. For example, when the processing condition is color printing although the image former 6 is capable of only black and white printing or when the processing condition is the use of thick paper although there is no thick paper left, the processing is inhibited. When the processing is inhibited, by the control by the controller 8, a message saying that the processing cannot be performed may be printed onto the sheet as shown in FIG. 5B or displayed on the display 4b.

The communicator 10 operates as transmitting means for transmitting information such as the processing code related to the processing performed by the image processor 13 or the image former 6. In the present embodiment, the information is transmitted to the server 33. When the additional image includes the identification information of the original image or when the identification information (for example, a two-dimensional code) of the original image is added to the original image, the identification information of the original image is extracted together with the additional image, and the information and the extracted identification information are transmitted to the server 33.

Figure 8:
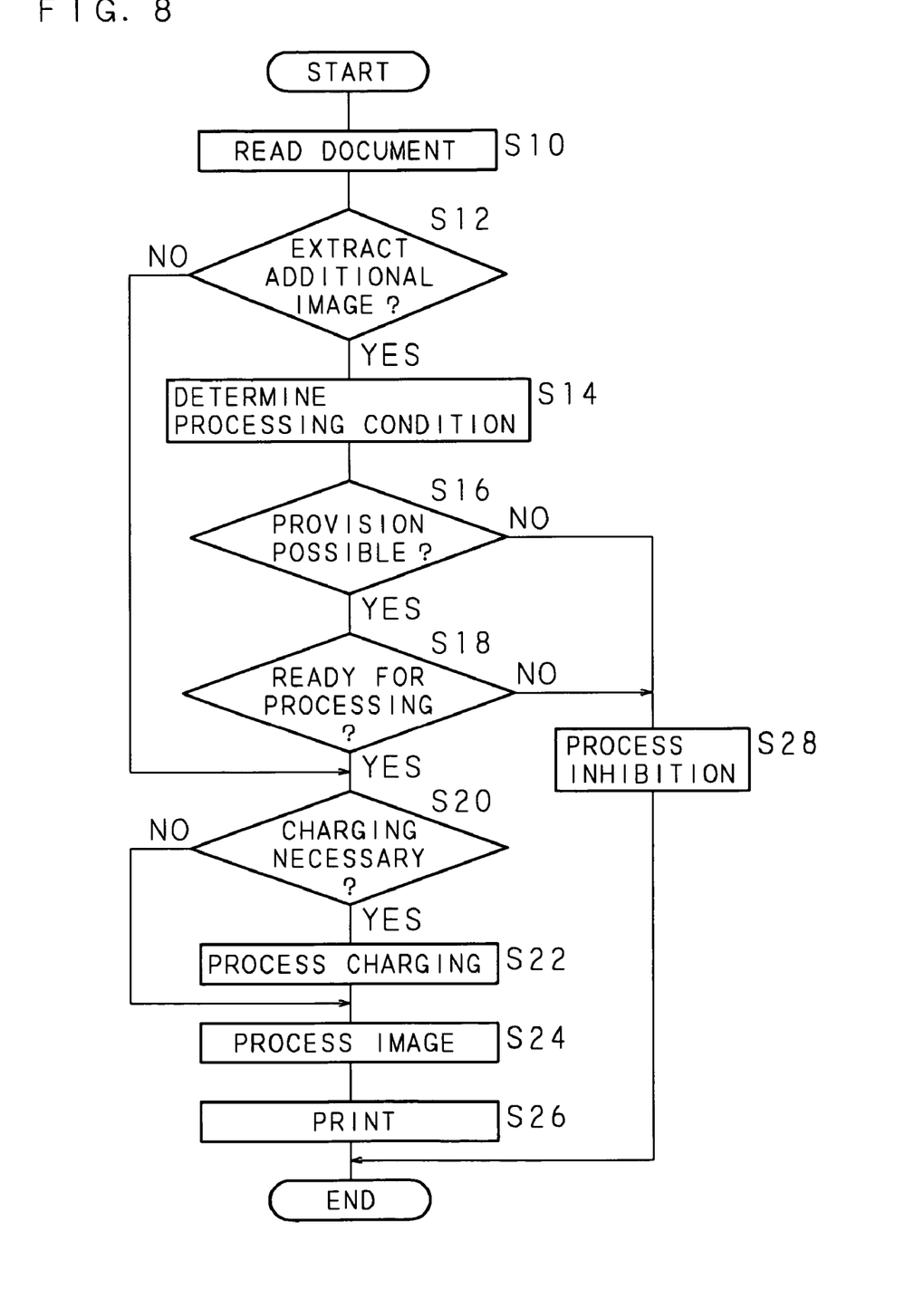
FIG. 8 is a flowchart showing an example of the processing procedure of the read original image.

FIG. 8 is a flowchart showing an example of the processing procedure of the read original image. When a selection of the copy function is accepted by the operation unit 4 and a start key of the operation unit 4 or the like is depressed with the original detected by the document sensor 2b, by the control by the controller 8, the reading of the original is performed by the image reader 2 (S10), and the read original image is stored into the memory 6a. The image processor 13 performs the additional image extraction processing on the original image stored in the memory 6a by the control by the controller 8.

When the additional image is extracted (S12: YES), the image processor 13 performs the pattern recognition of the extracted additional image, and transmits the recognition result to the controller 8. The controller 8 determines the processing condition corresponding to the additional image (recognized pattern) based on the association stored in the manager 14 (S14). When printing is inhibited and provision is impossible (S16: NO) or when the image processor 13 or the image former 6 is not ready for the processing (S18: NO) although provision is possible (S16: YES), the inhibition processing is performed (S28), and for example, by the control by the controller 8, a message saying that printing is impossible is recorded onto the sheet or displayed on the display 4b.

When the image processor 13 or the image former 6 is ready for the processing (S18: YES), if charging is necessary (S20: YES), by the control by the controller 8, the charging processing based on the processing condition of the charging processor 16 is performed (S22). After the charging processing (S22) or when the charging processing is unnecessary (S20: NO), by the control by the controller 8, the image processing based on the processing condition is performed by the image processor 13 (S24), and the printing (image recording processing) based on the processing condition is performed by the image former 6 (S26).

When the original image is copied, the image size is reduced, the number of colors is reduced, the sheet used for printing is changed and the amount of money charged is changed according to the additional image, so that high-quality copying can be prevented without usability being impaired. In addition, copying can be flexibly restricted.

Moreover, the processing code of the performed processing and the like are transmitted from the communicator 10 to the server 33 by the control by the controller 8. The server 33 can check the number of times of reading of the original image to which the additional image is added and check the number of times of each processing performed on the original image to which the additional image is added.

While the original image is read by the image reader 2 in the above-described embodiment, for example, when the original image is read by an image scanner connected to the PC 32 and the read original image is transmitted from the PC 32, accepted by the communicator 10 of the multifunction apparatus 1 and stored in the memory 6a, the additional image can also be extracted similarly to when the original image is read by the image reader 2.

Second Embodiment

Figure 9:
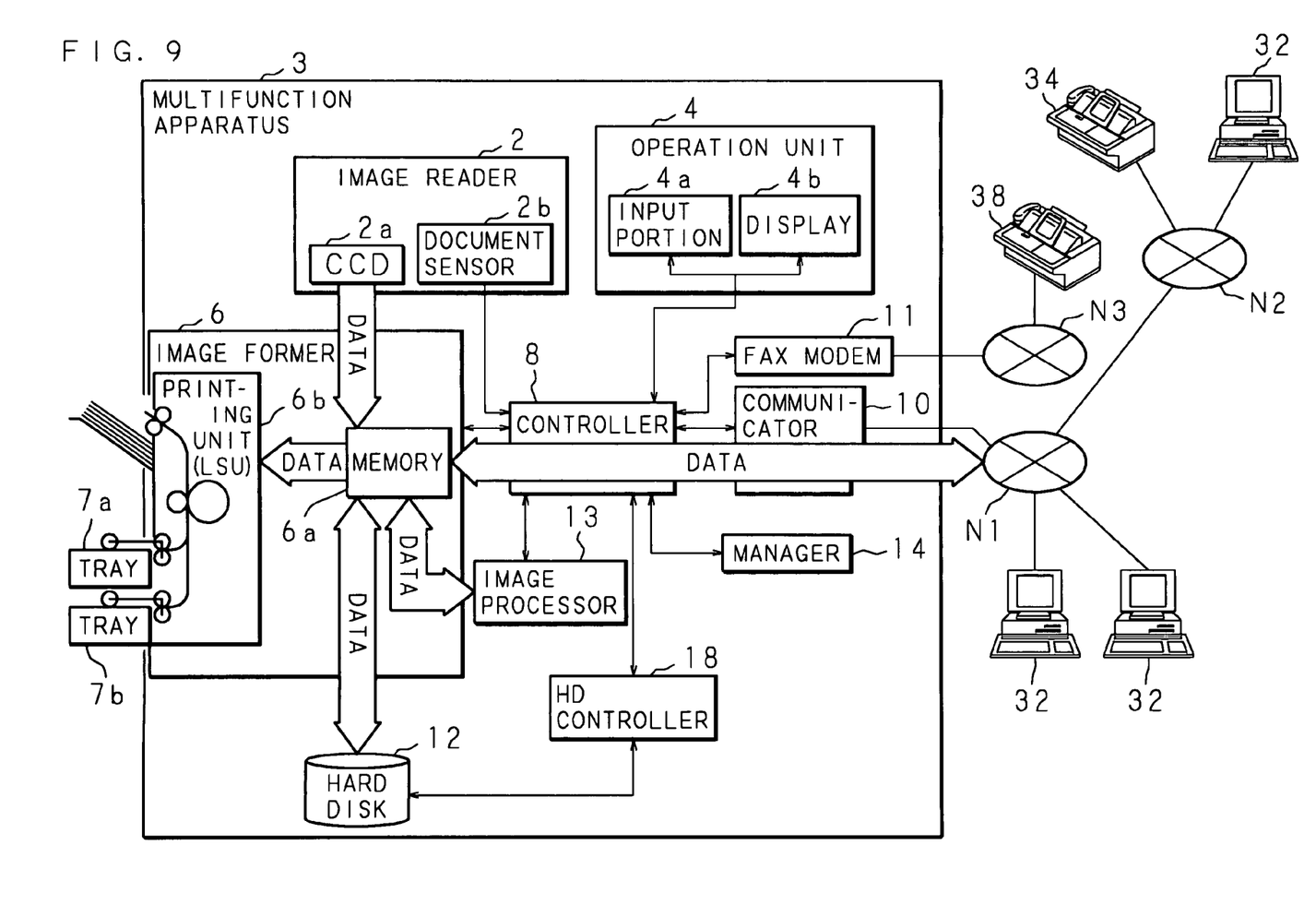
FIG. 9 is a block diagram showing an example of an image processing system including an image recording apparatus (copier) according to the present invention.

FIG. 9 is a block diagram showing an example of an image processing system including an image recording apparatus (copier) according to the present invention. The image processing system is similar to that of the first embodiment (FIG. 1), and a multifunction apparatus 3 is connected to the internal network N1 to which a plurality of PCs 32 are connected. The internal network N1 is connected to the external network N2 to which the iFAX 34, the PC 32 and the like are connected.

The multifunction apparatus (image recording apparatus) 3 is similar to the multifunction apparatus 1 of the first embodiment (FIG. 1), and has: the image reader 2 having the CCD 2a and the document sensor 2b; the operation unit 4 having the input portion 4a and the display 4b; the image former 6 having the memory 6a, the trays 7a and 7b and the printing unit (LSU) 6b; the communicator 10; the FAX modem 11; the hard disk (hard disk drive) 12; the HD controller 18; the image processor 13; the manager 14; and the controller 8. Similarly to the multifunction apparatus 1 of the first embodiment, the multifunction apparatus 3 is capable of operating as a copier, a printer, a network scanner and a facsimile.

The image processor 13 operates as adding means for adding, to an image to be recorded onto a sheet, the additional image related to the processing condition of the image. The additional image is a pattern-recognizable image such as a two-dimensional code, and for the additional image, yellow, fine lines or the like is used so that the image is difficult to visually recognize. The additional image is, for example, prestored in the manager 14, and an addition instruction or the specification of the additional image (specification of the processing condition) of the operation unit 4 can be accepted by the operation unit 4. Alternatively, the addition instruction and the specification of the additional image (specification of the processing condition) can be accepted from the PC 32.

Consequently, when the addition instruction and the specification of the additional image (specification of the processing condition) are accepted with respect to the image accepted by the image reader 2 or the communicator 10, by the control by the controller 8, the additional processing of the specified additional image is performed by the image processor 13, so that the image to which the additional image is added can be recorded onto a sheet by the image former 6. And the original to which the additional image is added is read by the multifunction apparatus 1 of the first embodiment, so that the processing corresponding to the additional image can be performed. Both the multifunction apparatus (image processing apparatus) 1 of the first embodiment and the multifunction apparatus (image recording apparatus) of the second embodiment may be connected to the internal network N1.

While the above-described embodiments are described with a linear additional image as an example, the configuration of the additional image is arbitrary. The color thereof is not limited to yellow, and an arbitrary color may be used. The additional image may be added to part of the original instead of being added to the entire area of the original. The processing condition corresponding to the additional image is also arbitrary, and a structure is adoptable such that one additional image corresponds to one or a plurality of processing conditions or that one additional image corresponds to one processing condition and a plurality of kinds of additional images are added to the original image.

As this invention may be embodied in several forms without departing from the spirit of essential characteristics thereof, the present embodiments are therefore illustrative and not restrictive, since the scope of the invention is defined by the appended claims rather than by description preceding them, and all changes that fall within metes and bounds of the claims, or equivalence of such metes and bounds thereof are therefore intended to be embraced by the claims.

The invention claimed is:

1. An image processing apparatus, comprising:
   image reading means for reading an image of a document that includes an original image portion and an additional image portion overlapping each other;
   image processing means for forming a processing image based on the image read by the image reading means; and
   extracting means for extracting the additional image portion from the image read by the image reading means, wherein
   the additional image portion represents a forming condition for forming the processing image by the image processing means,
   the image processing means forms the processing image in accordance with the forming condition based on the additional image portion extracted by the extracting means, and
   the processing image formed by the image processing means corresponds to the original image portion obtained by removing the additional image portion extracted by the extracting means from the image of a document read by the image reading means.

2. The image processing apparatus according to claim 1, wherein
   the forming condition includes a condition related to at least one of a size of the processing image and a number of colors of the processing image.

3. The image processing apparatus according to claim 1, wherein
   the forming condition includes a condition related to a processing to record onto the sheet.

4. The image processing apparatus according to claim 1, wherein
   the forming condition includes a condition related to a processing to charge.

5. The image processing apparatus according to claim 1, further comprising:
   inhibiting means for inhibiting the image processing means from forming the processing image when the image processing means is not ready for the forming condition based on the additional image portion extracted by the extracting means.

6. The image processing apparatus according to claim 1, further comprising:
   transmitting means for transmitting information related to the processing image formation performed by the image processing means.

7. An image processing system, comprising:
   an image processing apparatus; and
   an image recording apparatus, wherein
   the image processing apparatus comprises:
      image reading means for reading an image of a document that includes an original image portion and an additional image portion overlapping each other;
      image processing means for forming a processing image based on the image read by the image reading means; and
      extracting means for extracting the additional image portion from the image read by the image reading means, wherein
   the image processing means forms the processing in accordance with the forming condition based on the additional image portion extracted by the extracting means; and
   the processing image formed by the image processing means corresponds to the original image portion obtained by removing the additional image portion extracted by the extracting means from the image of a document read by the image reading means; and
   the image recording apparatus comprises:
      adding means for adding an image for the additional image portion onto the sheet.

8. The image processing system according to claim 7, wherein
   the image added by the adding means is an image difficult to visually recognize.

9. An image processing, comprising:
   an image reading unit that reads an image of a document that includes an original image portion and an additional image portion overlapping each other; and
   an image processing unit that forms a processing image based on the image read by the image reading unit; and
   a controller that extracts the additional image portion from the image read by the image reading unit,
   wherein the additional image portion represents a forming condition for forming the processing image by the image processing unit,
   the image processing unit forms the processing in accordance with the forming condition based on the extracted additional image portion, and
   the processing image formed by the image processing unit corresponds to the original image portion obtained by removing the extracted additional image portion from the image of a document read by the image reading unit.

10. The image processing apparatus according to claim 9, wherein
    the forming condition includes a condition related to at least one of a size of the processing image and a number of colors of the processing image.

11. The image processing apparatus according to claim 9, wherein
    the forming condition includes a condition related to a processing to record onto the sheet.

12. The image processing apparatus according to claim 9, wherein
    the forming condition includes a condition related to a processing to charge.

13. The image processing apparatus according to claim 9, wherein the controller further inhibits
    the image processing unit from forming the processing image when the image processing unit is not ready for the forming condition based on the extracted additional image portion.

14. The image processing apparatus according to claim 9, further comprising:
    a communication unit that transmits information related to the processing image formation performed by the image processing unit.

15. An image processing system, comprising:
    an image processing apparatus; and
    an image recording apparatus, wherein the image processing apparatus comprises:
  an image reading unit that reads an image of a document including an original image portion and an additional image portion overlapping each other;
  an image processing unit that forms a processing image based on the image read by the image reading unit; and
a controller that extracts the additional image portion from the image read by the image reading unit,
wherein the image processing unit forms the processing image in accordance with the forming condition based on the extracted additional image portion, and
the processing image formed by the image processing unit corresponds to the original image portion obtained by removing the extracted additional image portion from the image of a document read by the image reading unit, and
the image recording apparatus comprises a controller that adds an image for the additional image portion onto the sheet.

16. The image processing system according to claim 15, wherein
the image added by the adding unit is an image difficult to visually recognize.

17. An image recording apparatus that records an image onto a sheet, comprising:
  a controller that adds an image that defines a recording condition of an original image recorded onto a sheet onto another.

* * * * *